(12) United States Patent
Goto

(10) Patent No.: US 9,924,554 B2
(45) Date of Patent: Mar. 20, 2018

(54) COMMUNICATION APPARATUS, CONTROL METHOD FOR THE COMMUNICATION APPARATUS, AND NON-TRANSITORY COMPUTER-READABLE STORAGE MEDIUM

(71) Applicant: CANON KABUSHIKI KAISHA, Tokyo (JP)

(72) Inventor: Fumihide Goto, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/768,430

(22) PCT Filed: Feb. 14, 2014

(86) PCT No.: PCT/JP2014/000763
§ 371 (c)(1),
(2) Date: Aug. 17, 2015

(87) PCT Pub. No.: WO2014/129153
PCT Pub. Date: Aug. 28, 2014

(65) Prior Publication Data
US 2016/0007396 A1    Jan. 7, 2016

(30) Foreign Application Priority Data
Feb. 19, 2013    (JP) .................. 2013-029950

(51) Int. Cl.
*H04W 76/02* (2009.01)
*H04L 29/08* (2006.01)
(Continued)

(52) U.S. Cl.
CPC ........ *H04W 76/023* (2013.01); *H04L 61/103* (2013.01); *H04L 67/16* (2013.01);
(Continued)

(58) Field of Classification Search
CPC .... H04W 76/02; H04W 76/023; H04L 67/16; H04L 61/103; H04L 29/08; H04L 29/12
See application file for complete search history.

(56) References Cited

U.S. PATENT DOCUMENTS

2005/0122921 A1* 6/2005 Seo ............... H04W 48/16
370/310
2005/0286075 A1   12/2005 Ryu
(Continued)

FOREIGN PATENT DOCUMENTS

JP    2005-110205 A    4/2005
JP    2007-174536 A    7/2007
(Continued)

*Primary Examiner* — Anez Ebrahim
(74) *Attorney, Agent, or Firm* — Canon U.S.A., Inc. IP Division

(57) ABSTRACT

A communication apparatus in which a service can more efficiently used is provided. The communication apparatus searches for an apparatus that provides a particular service and establishes a wireless connection to the other searched communication apparatus. Subsequently, an address of the other connected communication apparatus is obtained from the other communication apparatus, and the service provided by the other communication apparatus is used using the obtained address.

9 Claims, 9 Drawing Sheets

(51) Int. Cl.
*H04L 29/12* (2006.01)
*H04W 84/12* (2009.01)
*H04W 84/18* (2009.01)

(52) U.S. Cl.
CPC ......... *H04L 61/2015* (2013.01); *H04W 84/12* (2013.01); *H04W 84/18* (2013.01)

(56) References Cited

U.S. PATENT DOCUMENTS

| | | | |
|---|---|---|---|
| 2006/0116147 A1* | 6/2006 | Hashizume | H04B 7/022 455/515 |
| 2006/0187858 A1* | 8/2006 | Kenichi | H04L 12/5692 370/254 |
| 2007/0171910 A1* | 7/2007 | Kumar | H04L 63/0428 370/392 |
| 2009/0010184 A1 | 1/2009 | Luiro | |
| 2011/0149806 A1 | 6/2011 | Verma | |
| 2012/0320413 A1 | 12/2012 | Nagasaki | |
| 2013/0223280 A1* | 8/2013 | Choi | H04L 67/104 370/254 |

FOREIGN PATENT DOCUMENTS

| | | |
|---|---|---|
| JP | 2008-541500 A | 11/2008 |
| JP | 2011-35768 A | 2/2011 |
| JP | 2011-228883 A | 11/2011 |
| JP | 2012-186643 A | 9/2012 |
| JP | 2012-522461 A | 9/2012 |
| WO | 2009/120576 A2 | 10/2009 |

\* cited by examiner

[Fig. 1]
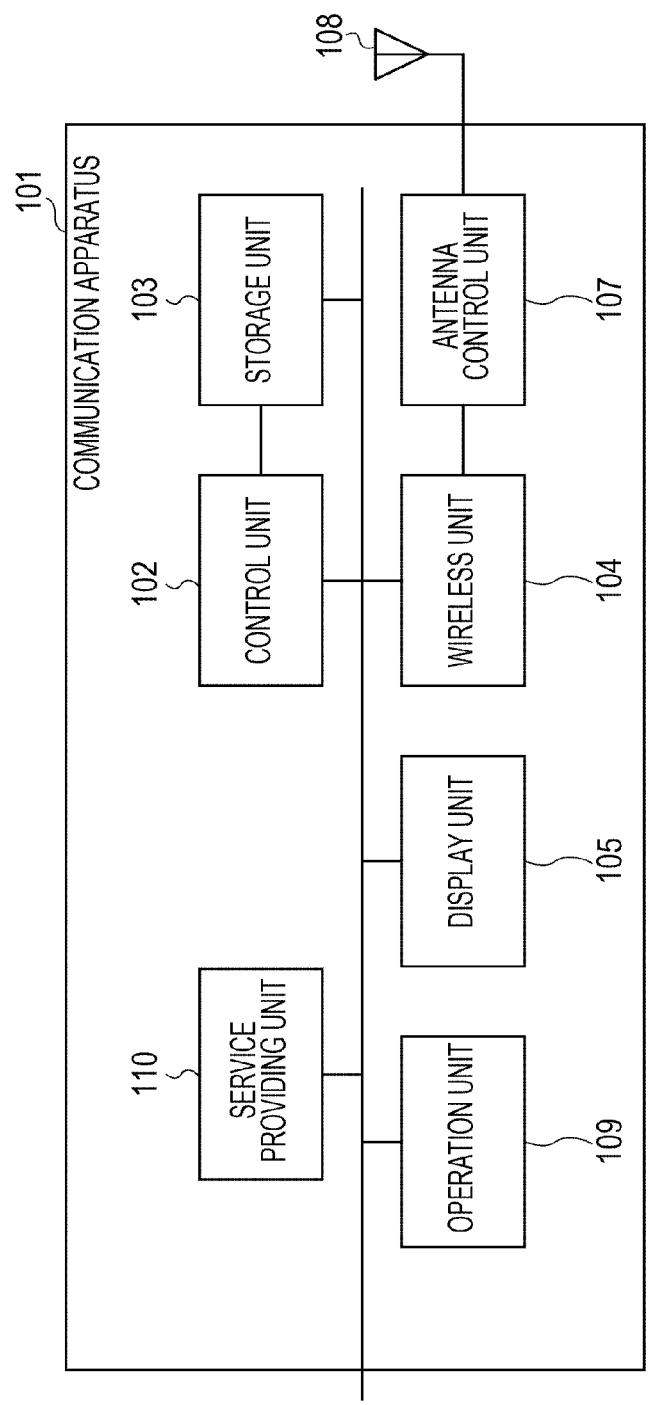

[Fig. 2]
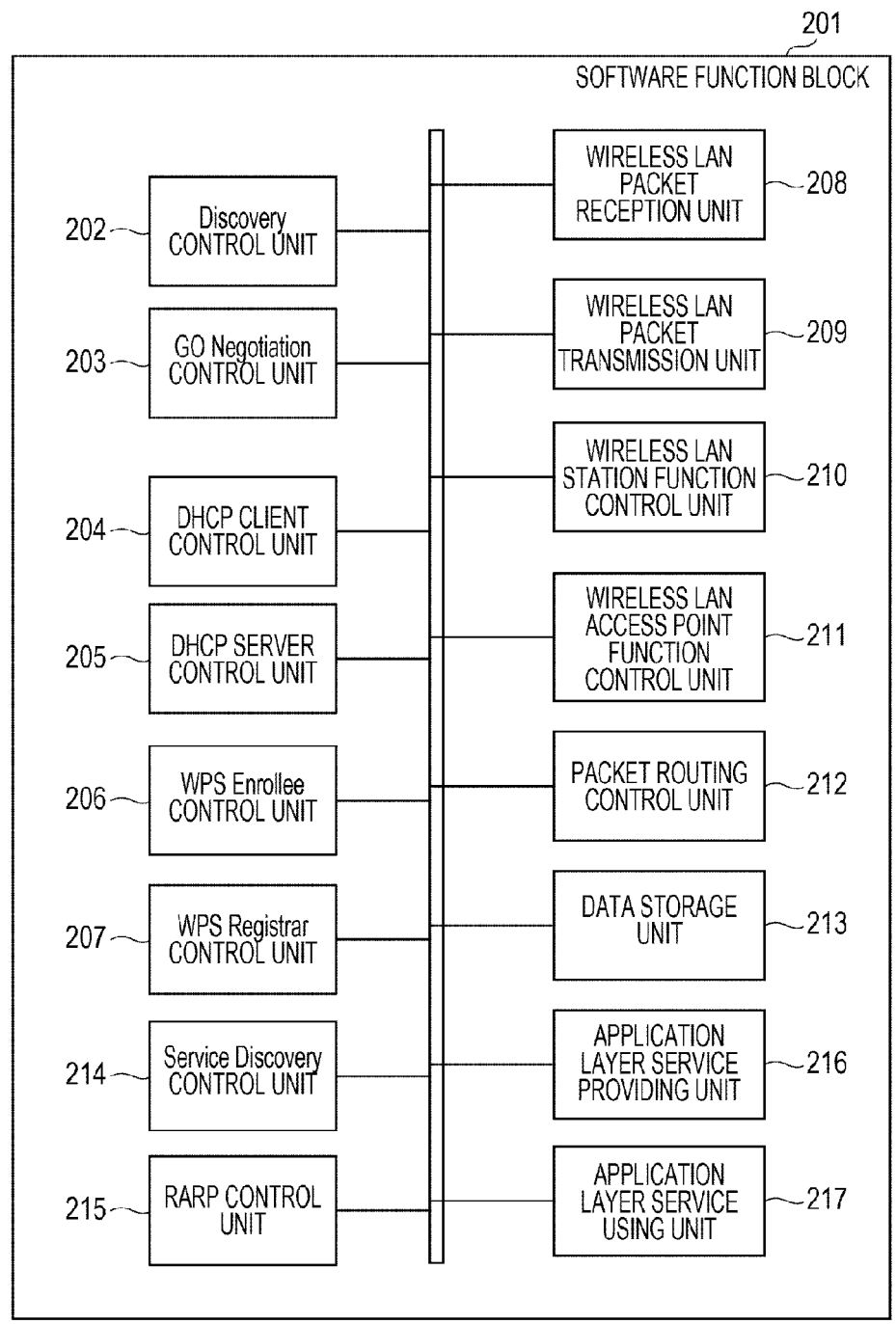

[Fig. 3]
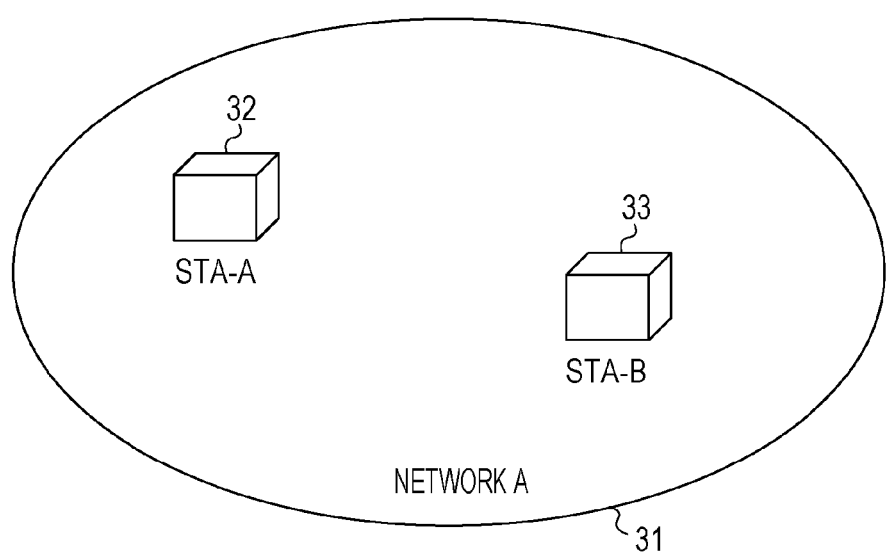

[Fig. 4]
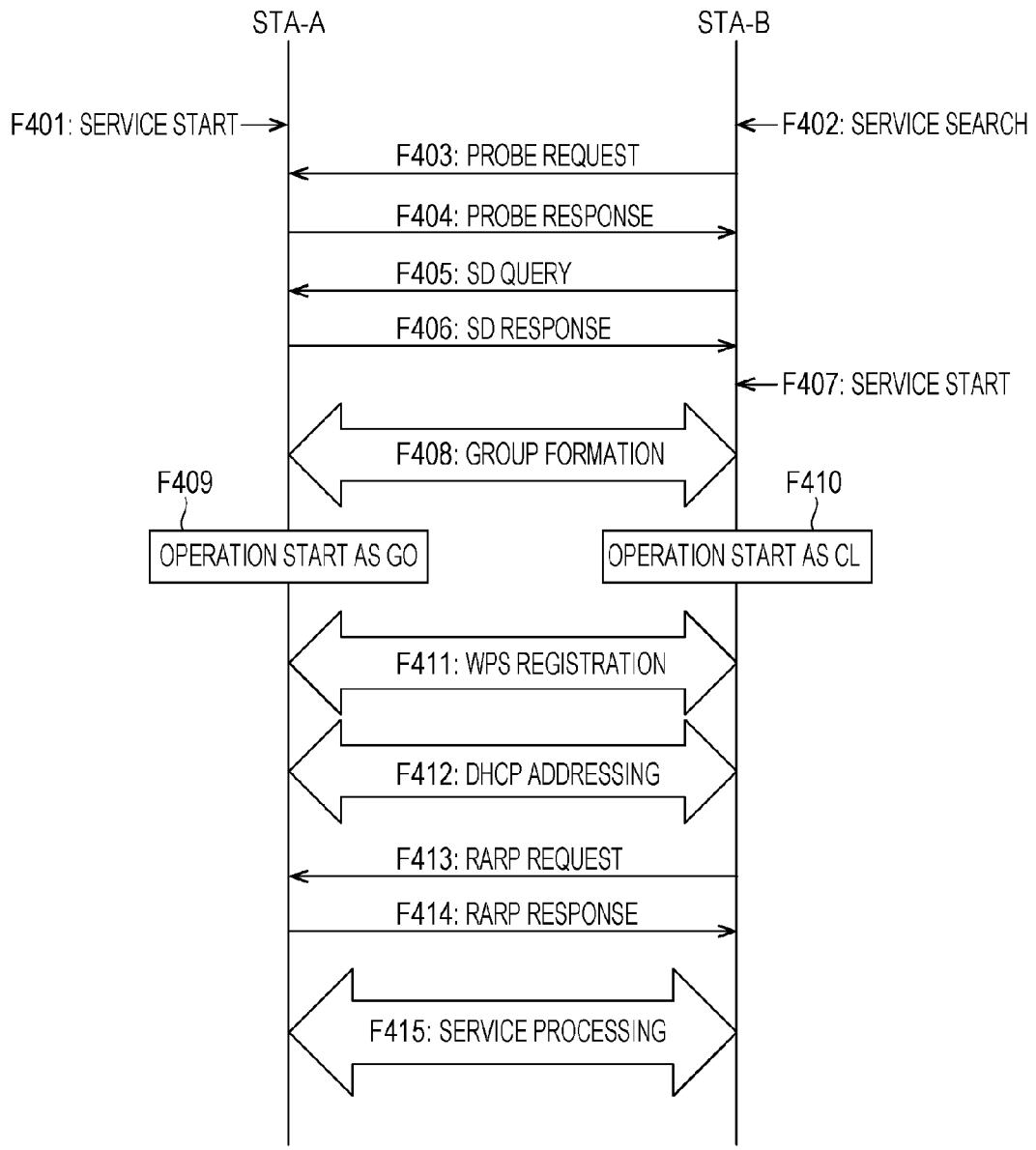

[Fig. 5]
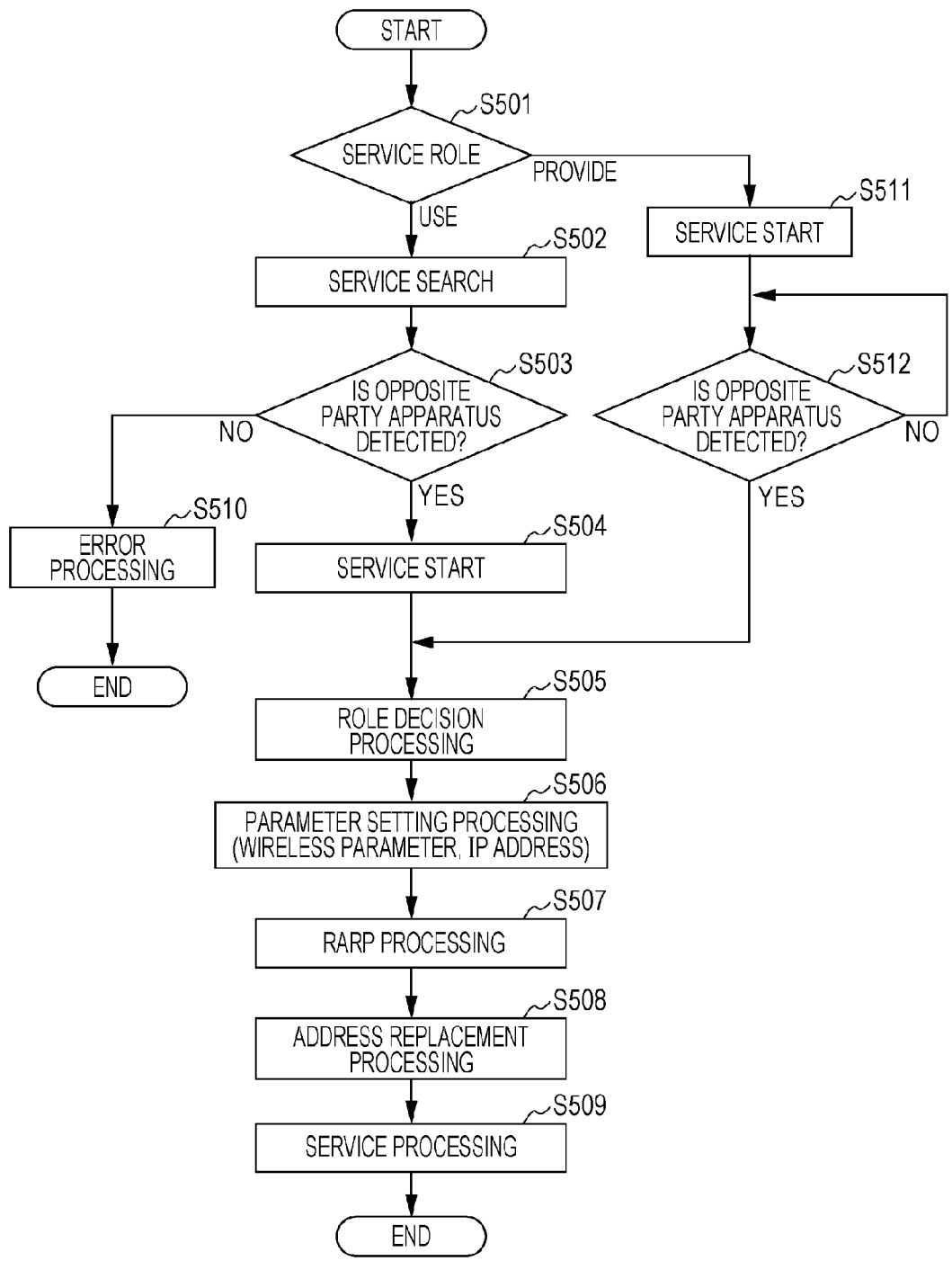

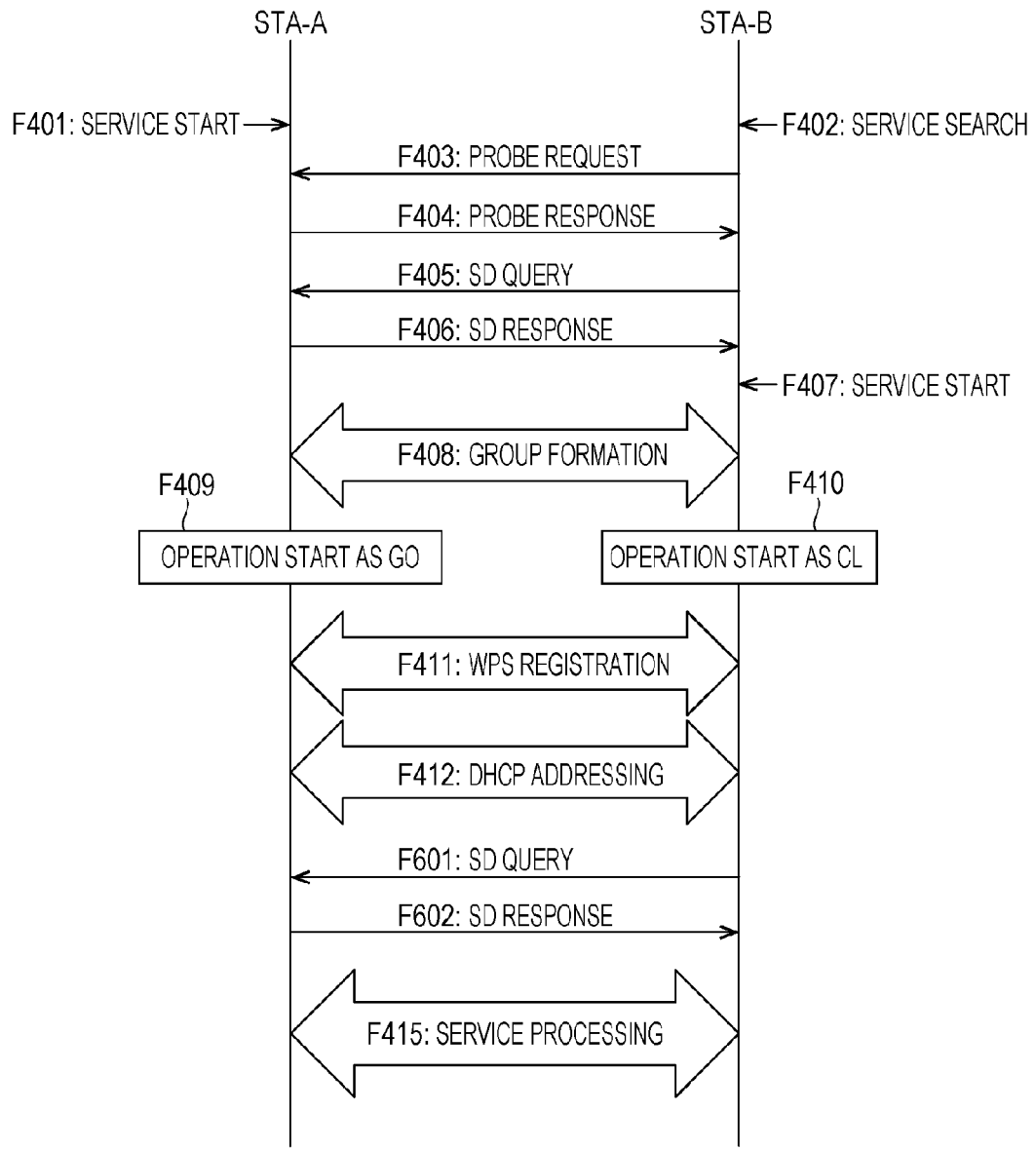
[Fig. 6]

[Fig. 7]
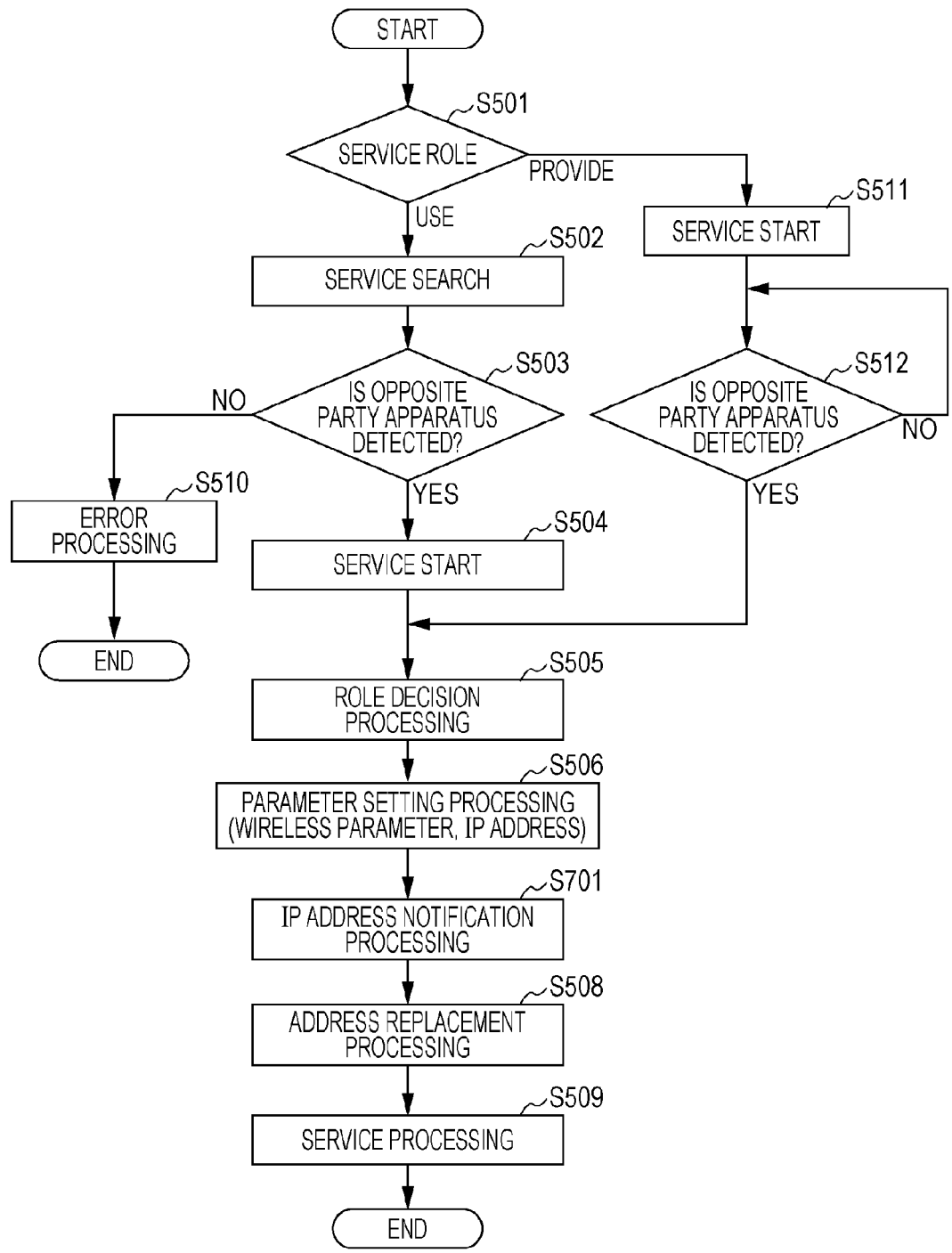

[Fig. 8]
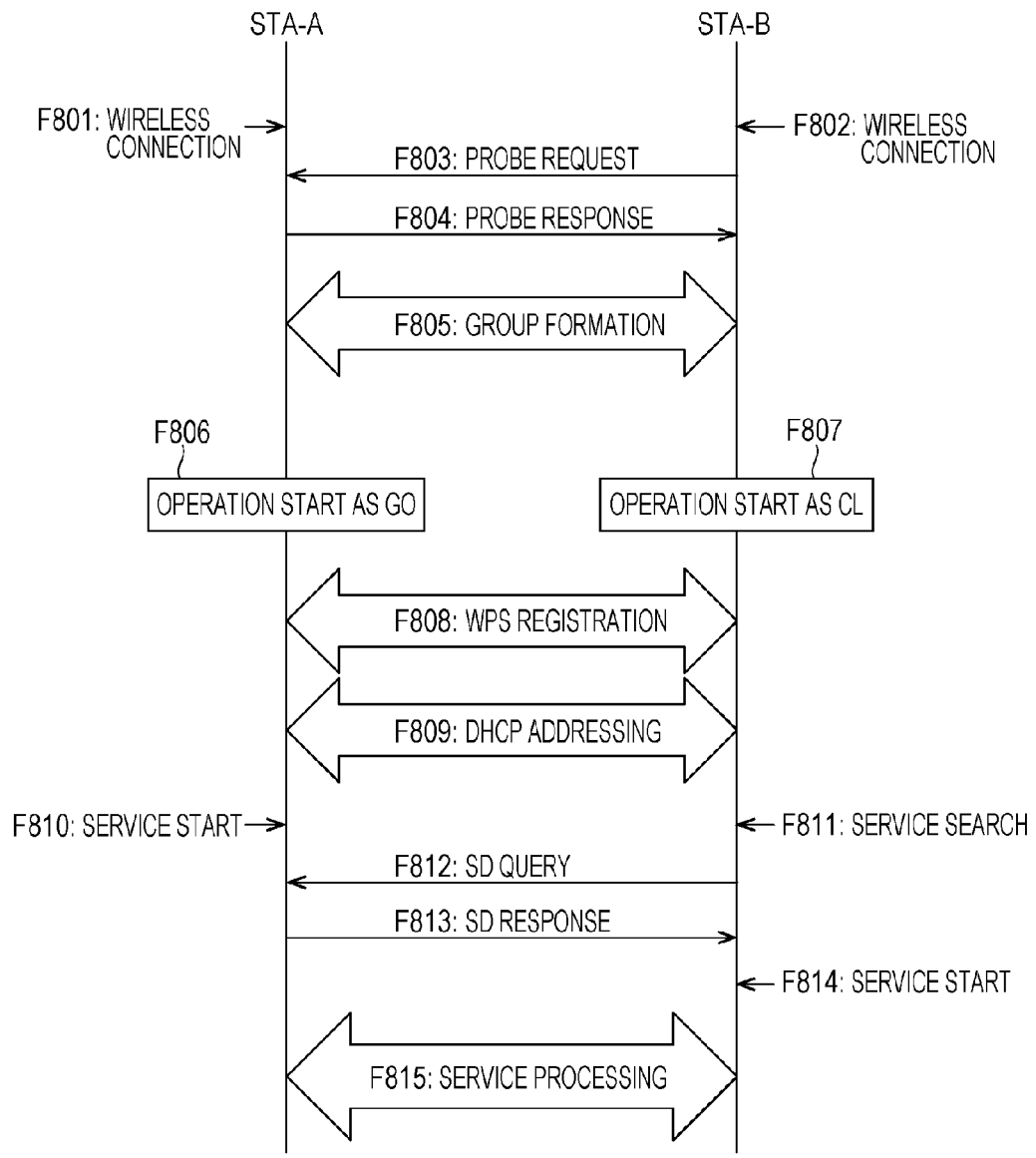

[Fig. 9]
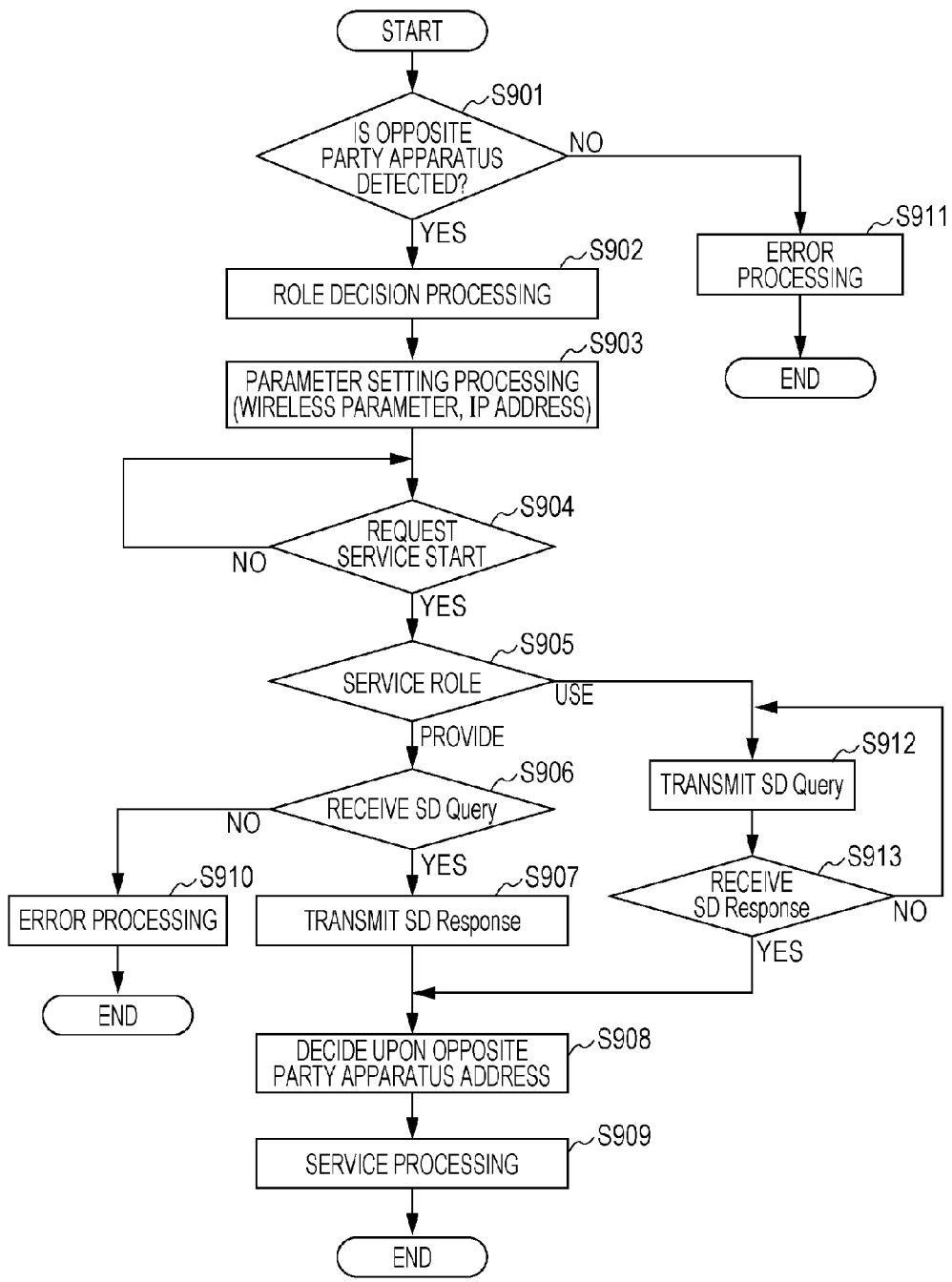

COMMUNICATION APPARATUS, CONTROL METHOD FOR THE COMMUNICATION APPARATUS, AND NON-TRANSITORY COMPUTER-READABLE STORAGE MEDIUM

TECHNICAL FIELD

The present invention relates to a communication apparatus, a control method for the communication apparatus, and a non-transitory computer-readable storage medium.

BACKGROUND ART

In recent years, the number of cases has been increased in which a wireless LAN station function is mounted to an electronic device such as a digital camera or a printer, and the electronic device is used as a communication apparatus while being connected to a wireless LAN. For example, PTL 1 discloses a method in which a wireless LAN function is mounted to the digital camera to facilitate image sharing.

Wi-Fi Alliance has established a specification called Wi-Fi Direct (registered trademark). According to Wi-Fi Direct, a protocol for deciding upon whether each of the electronic devices operates as either a wireless LAN access point or a wireless LAN station is established. While the protocol is executed, it is possible to automatically decide upon which one of the electronic devices operates as the wireless LAN access point and the other of which operates as the wireless LAN station. When this Wi-Fi Direct is used, the access point may not separately be prepared any more, and the mutual electronic devices can execute various services (such as image sharing and printing) through a direct communication, so that the usability for users is improved.

In addition, a function of searching for a content of a service provided by another apparatus on an application layer (Service Discovery function) is established as an optional function of Wi-Fi Direct. According to the present Service Discovery function, information on a service provided by the electronic device corresponding to a connection opposite party can be found out before the execution of the connection processing, and the usability for the users is improved.

CITATION LIST

Patent Literature

PTL 1: Japanese Patent Laid-Open No. 2011-35768

SUMMARY OF INVENTION

Technical Problem

When the above-described Service Discovery function is used, the information on the service provided by the opposite party apparatus can be found out by the communication on the wireless LAN layer, but an IP address of the opposite party apparatus is not decided upon yet at this time point. On the other hand, the service executed on the application layer is executed on a TCP/IP protocol. Therefore, the IP address of the opposite party apparatus is to be found out to use the service. For that reason, after the connection on the wireless LAN layer, the service information on the TCP/IP is searched for again, and load is imposed on the processing.

In view of the above, the present invention provides a communication apparatus that can more efficiently use the service.

Solution to Problem

According to an aspect of the present invention, there is provided a communication apparatus including: a search unit configured to search for an apparatus that provides a particular service; a connection unit configured to establish a wireless connection to another communication apparatus searched for by the search unit; and an obtaining unit configured to obtain an address of the other communication apparatus connected by the connection unit from the other communication apparatus, in which the service provided by the other communication apparatus is used using the obtained address.

Further features of the present invention will become apparent from the following description of exemplary embodiments with reference to the attached drawings.

BRIEF DESCRIPTION OF DRAWINGS

FIG. 1 is a block diagram of a configuration of an apparatus.

FIG. 2 is a software function block diagram within the apparatus.

FIG. 3 illustrates an example of a network configuration to which an embodiment of the present invention is applied.

FIG. 4 illustrates an example of a sequence between communication apparatuses according to a first exemplary embodiment.

FIG. 5 illustrates an example of a flow chart for the communication apparatuses according to the first exemplary embodiment.

FIG. 6 illustrates an example of a sequence between communication apparatuses according to a second exemplary embodiment.

FIG. 7 illustrates an example of a flow chart for the communication apparatuses according to the second exemplary embodiment.

FIG. 8 illustrates an example of a sequence between communication apparatuses according to a third exemplary embodiment.

FIG. 9 illustrates an example of a flow chart for the communication apparatuses according to the third exemplary embodiment.

DESCRIPTION OF EMBODIMENTS

First Exemplary Embodiment

Hereinafter, a communication apparatus according to the present exemplary embodiment will be described in detail with reference to the drawings. An example in which a wireless LAN system in conformity to IEEE802.11 series is used will be described below, but a communication mode is not limited to the wireless LAN in conformity to the IEEE802.11.

A hardware configuration according to the present exemplary embodiment will be described.

FIG. 1 is a block diagram representing an example of a configuration of the individual apparatuses which will be described below according to an embodiment to which the present invention can be applied. FIG. 1 illustrates an entirety of a communication apparatus 101. A control unit 102 controls the entire apparatus by executing a control program stored in a storage unit 103. The control unit 102 includes one or a plurality of processors such as a CPU or an MPU. The control unit 102 also performs a setting control on communication parameters with another apparatus. The storage unit 103 stores the control program executed by the control unit 102 and various information such as the communication parameters. The storage unit 103 may also store image data, files, and the like that are generated by the communication apparatus or received from an external apparatus. The storage unit 103 is composed of various memories such as a ROM, a RAM, an HDD, or a flash memory. Various operations which will be described below are conducted while the control unit 102 executes the control program stored in the storage unit 103.

A wireless unit 104 performs a wireless LAN communication in conformity to the IEEE802.11 series. A display unit 105 performs various displays and has a function with which an output of information that can be visually recognized such as an LCD or an LED or a sound output such as a speaker can be carried out. The display unit 105 is provided with the function of outputting at least one of the visual information and the sound information.

An antenna control unit 107 transmits and receives signals based on the wireless communication by controlling an antenna 108. An operation unit 109 is used by a user to perform various inputs and the like to operate the communication apparatus. The operation unit 109 is composed of various buttons, a touch panel, or the like.

A service providing unit 110 is provided with a function of executing a service provided on the application layer. For example, a printing function is provided in a case where the present communication device is a printer, and an image pickup function is provided in a case where the present communication device is a digital camera.

FIG. 1 illustrates an example, and the communication apparatus 101 may be provided with a hardware configuration other than the hardware configuration illustrated in FIG. 1. For example, the communication apparatus 101 is provided with a printing unit in case of a printer, and the communication apparatus 101 is provided with an image pickup unit in case of a digital camera.

FIG. 2 is a block diagram representing a configuration example of a software function block where a communication control function which will be described below is executed. FIG. 2 illustrates an entirety of a software function block 201. A Discovery control unit 202 operates search processing for searching for a communication apparatus corresponding to a communication opposite party.

A Go Negotiation control unit 203 performs a control based on the Wi-Fi Direct protocol specification and decides upon which one of which one of the communication apparatuses operates as the wireless LAN access point and the other of which operates as the wireless LAN station with regard to the roles on the wireless layer. According to Wi-Fi Direct, the communication apparatus that executes the wireless LAN access point function is referred to as P2P group owner (hereinafter, which will be referred to as GO), and the communication apparatus that executes the wireless LAN station function is referred to as P2P client (hereinafter, which will be referred to as CL). In case of the GO or the wireless LAN access point, a wireless LAN access point function control unit 211 which will be described below is activated. In case of the CL or the wireless LAN station, a wireless LAN station function control unit 210 which will be described below is activated. This GO Negotiation protocol is defined by the Wi-Fi Direct specification. Since this is not a point of the present invention, a description thereof will be omitted. According to Wi-Fi Direct, a network constructed by the GO is referred to as P2P group. In the present specification too, the network may be described as P2P group in some cases. According to the present exemplary embodiment, the network and the P2P group are described to have the same meaning.

In the present specification, the P2P group owner (GO), the P2P client (CL), and a group of communication apparatuses a role of which is not yet decided upon is collectively referred to as P2P device.

A DHCP client control unit 204 is activated when the role of its own communication apparatus is the wireless LAN station in the Go Negotiation control unit 203. A DHCP server control unit 205 is activated when the role of its own communication apparatus is the wireless LAN access point in the Go Negotiation control unit 203.

A WPS Enrollee control unit 206 receives communication parameters used for the wireless LAN communication from another WPS Registrar apparatus. The WPS Enrollee control unit 206 is operated when the role of its own communication apparatus is the wireless LAN station similarly as in the DHCP client control unit 204. A WPS Registrar control unit 207 provides communication parameters used for the wireless LAN communication to another WPS Enrollee apparatus. The WPS Registrar control unit 207 is operated when the role of its own communication apparatus is the wireless LAN access point similarly as in the DHCP server control unit 205. A communication parameter provided by the WPS Registrar is an SSID as a network identifier, an encryption key, an encryption system, an authentication key, or a parameter of an authentication system or the like.

A wireless LAN packet reception unit 208 and the wireless LAN packet transmission unit 209 govern transmission and reception of any packets including an upper layer communication protocol. The wireless LAN station function control unit 210 executes authentication and encryption processing or the like when its own communication apparatus operates as the wireless LAN station and joins the wireless network constructed by the apparatus operating as the wireless LAN access point. The wireless LAN access point function control unit 211 constructs the wireless network when its own communication apparatus operates as the wireless LAN access point function and executes the authentication and encryption processing, management on the communication opposite party apparatus, or the like. It is possible to operate one of the wireless LAN station function control unit 210 and the wireless LAN access point function control unit 211 or both of the functions at the same time.

A packet routing control unit 212 performs bridge or routing of the communication packet when the wireless LAN access point function control unit 211 is operated. A data storage unit 213 stores and holds software itself, and wireless LAN parameters, and various tables such as the above-described DHCP address table and an ARP table.

A Service Discovery control unit 214 governs the Service Discovery function particular to Wi-Fi Direct. With the Service Discovery function, an action frame defined by the IEEE802.11u is transmitted and received, so that service information held by the opposite party communication apparatus is exchanged. Specifically, SD Query is transmitted, and SD Response is received as a response. Alternatively, the SD Query from the opposite party apparatus is received, and the SD Response is transmitted as a response. According to the present exemplary embodiment, the service information is information indicating the service on the application layer provided by the communication apparatus. The service on the application layer is a printing service, a moving image streaming service, a file transfer service, or the like. In addition, the service information may include identification information such as a URL for accessing the service provided by the communication apparatus.

A RARP protocol control unit 215 executes a Reverse address resolution protocol defined by RFC 903. Specifically, a protocol function for obtaining a corresponding IP address is executed by using the MAC address as a key.

A service providing unit 216 provides the service on the application layer. Herein, the application layer refers to a service providing layer in an upper layer at the fifth or upper layer in an OSI reference model. That is, the service providing unit 216 provides, for example, the printing function (the printing service), the image streaming function (the moving image streaming service), the file transfer function (the file transfer service), or the like.

A service using unit 217 on the application layer uses the service provided by the service providing unit on the application layer of the opposite apparatus. That is, the service using unit 217 governs a function of transmitting a printed product to the printing service providing apparatus, a function of transmitting a moving image to a digital display, or the like.

All the function blocks illustrated in FIG. 2 may be provided by software, but at least a part of the function blocks may also be provided by hardware. The respective function blocks illustrated in FIG. 2 have mutual relationships. The respective function blocks illustrated in FIG. 2 are also examples. A plurality of function blocks may construct one function block, and any of the function blocks may further be divided into blocks where a plurality of functions are executed.

In addition, according to the present exemplary embodiment, a service on the application layer is realized by an apparatus that provides the service and an apparatus that uses the service. When the printing service is taken as an example for the service on the application layer, the service providing apparatus is a printer and receives printing data transmitted from a PC or the like to perform printing. On the other hand, the service using apparatus is an apparatus such as a PC and generates printing data to be transmitted to the printer functioning as the service providing apparatus. When the image streaming service is taken as an example for the service, the service providing apparatus is a display apparatus and receives image data from a PC or the like to display the image data. On the other hand, the service using apparatus is an apparatus such as a PC and generates image data to be transmitted to the display apparatus functioning as the service providing apparatus.

FIG. 3 illustrates a communication apparatus A32 (hereinafter, which will be referred to as STA-A), a communication apparatus B33 (hereinafter, which will be referred to as STA-B), and a network A31 (hereinafter, which will be referred to as network A) which is composed of the STA-A and the STA-B. All of these apparatuses include the configurations of FIG. 1 and FIG. 2 described above. The STA-A and the STA-B both correspond to WiFi-Direct and execute processing illustrated in a sequence or a flow chart which will be described below. The apparatus operating as the GO among the STA-A and the STA-B constructs the network A, and the apparatus operating as the CL joins the constructed network A. According to the present exemplary embodiment, it is set that the STA-A operates as the service providing apparatus, and the STA-B operates as the service using apparatus.

FIG. 4 is a sequence diagram illustrating a communication between the STA-A and the STA-B. In the present sequence, the service search by the Service Discovery defined by the Wi-Fi Direct specification is executed before the connection to the wireless LAN. In a case where the communication apparatus that provides a desired service exists, the connection processing for the wireless LAN is conducted, and after that, the relevant service is executed.

The STA-A operating as the service providing apparatus starts the provision of the service in response to an instruction from the user (F401). On the other hand, the STA-B operating as the service using apparatus starts the service search processing for searching for the service providing apparatus in response to an instruction from the user (F402).

The service using apparatus and the service providing apparatus on the application layer according to the present exemplary embodiment are as follows, for example.

When the service on the application layer is the printing service, the using apparatus is an apparatus that has an image or data to be printed and transmits the printing data to the providing apparatus, and the providing apparatus is an apparatus that has the printing function and prints the printing data transmitted from the using apparatus. Specifically, the using apparatus is a PC, a digital camera, a smart phone, or the like, and the providing apparatus is a printer, a multifunctional machine, or the like.

When the service on the application layer is the video streaming service, the using apparatus is a video recording apparatus such as a digital camera or a camcorder, and the providing apparatus is an image display apparatus such as a digital TV or a projector.

When the service on the application layer is set as DLNA (registered trademark), for example, the using apparatus is a DMS (digital media server), and the providing apparatus is a DMR (digital media renderer). Since various device classes exist in the DLNA specification, this description is an example. See the DLNA specification for detail.

When the service on the application layer is Wi-Fi miracast (registered trademark), a video display apparatus called Sink corresponds to the providing apparatus, and a video accumulation apparatus called Source corresponds to the using apparatus.

In case of a UPnP protocol compliant device, the providing apparatus is a UPnP device, and the using apparatus is a control point. The service and the role on the service exemplified herein are merely examples, and the service and the role on the service are not intended to limit to the above.

Prior to the service search, the STA-B that has received the instruction of the service search processing from the user in F402 performs a broadcast transmission of a Probe Request signal to search for the opposite party apparatus corresponding to the communication opposite party (F403).

When the Probe Request signal is received, the STA-A replies a Probe Response signal to the STA-B (F404). Since the STA-B receives the Probe Response signal, it is possible to recognize that the STA-A exists as the candidate apparatus corresponding to the communication opposite party. Therefore, the STA-B transmits the SD Query signal to investigate whether or not the STA-A can provide the service desired by the user (F405). The SD Query signal is a query signal for investigating whether or not the communication apparatus at the transmission destination provides the desired service as described above. The SD Query signal may specify a wild card for searching for all the services or may also specify a particular service. The query based on the present SD Query signal can be executed before the communication apparatuses establish a wireless LAN connection (in a pre-association state).

The STA-A that has received the SD Query signal transmits the SD Response signal as a response (F406). In a case where the SD Query signal specifies the wild card, the SD Response signal includes the information indicating the service provided by the STA-A. On the other hand, the SD Query signal specifies the particular service, the SD Response signal includes the information as to whether or not the STA-A can provide this particular service. When the SD Response signal is transmitted, the STA-A holds the identification information such as the MAC address of the STA-B that has transmitted the SD Query in its own storage unit.

In a case where the STA-B refers to the content of the SD Response signal and confirms that the STA-A can provide the desired service on the basis of the decision by the user or the self-governing decision by the communication apparatus, the STA-B holds the identification information such as the MAC address of the STA-A in the storage unit. The STA-B then performs the service start instruction of the desired service in accordance with the instruction of the user (F407).

Herein, the example has been described in which the query on the providing service is conducted by the SD Query signal after the search for the communication apparatus by the Probe Request signal is conducted. However, the additional information element related to the service on the application layer may be added to the Probe Request signal, and the search including the service of the opposite party apparatus may be conducted only by the Probe Request signal. In this case, the exchange of the SD Query signal and the SD Response signal may or may not be conducted. It is however noted that the holding of the identification information such as the mutual MAC address is similarly executed.

The description on FIG. 4 will be given again. The STA-B executes the connection processing for the wireless LAN in accordance with the service start instruction F407. According to the present exemplary embodiment, Group Formation processing is executed to carry out the connection processing for the wireless LAN based on the WiFi Direct specification (F408). The present processing is controlled by the above-described Go Negotiation control unit 203. The Group Formation processing is role decision processing for deciding upon which one of the two communication apparatuses operates as the GO and the other of which operates as the CL. As a result of this role decision processing, it is set that the STA-A starts the operation as the GO (F409), and the STA-B starts the operation as the CL (F410).

Therefore, the WPS parameter exchange processing is executed while the STA-A is set as the WPS Registrar and the STA-B is set as the WPS Enrollee (F411).

Subsequently, the IP address setting processing is executed while the STA-A is set as the DHCP server and the STA-B is set as the DHCP client (F412).

The STA-B is notified of the service information of the STA-A by the Service Discovery processing in F405 and F406. In view of the above, the RARP protocol is executed to obtain the IP address of the STA-A which is used for executing the service processing by the application layer. A reason why the RARP protocol is used is that the MAC address of the STA-A is already obtained.

That is, the STA-B transmits the RARP request to the STA-A (F413). In response to the request, the STA-A transmits the RARP response to the STA-B (F414).

Herein, a reason why the IP address obtaining processing is conducted is that the protocol on the application layer such as DLNA or Bonjour is operated on TCP/IP, and the IP address is to be used to execute the service on the application layer.

With the RARP protocol processing illustrated in F413 and F414, the STA-B can confirm the IP address of the STA-A which is used for the service processing. For that reason, without executing the device search function on TCP/IP (for example, UPnP, Bonjour, or the like) again, it is possible to execute the service on the application layer (F415).

In the present sequence diagram, the example has been described in which the service using apparatus receives the request signal in the various signals and receives the response from the service providing apparatus. However, the request signal may be transmitted from the service providing apparatus, and the response may be received from the service using apparatus. The transmission apparatus for the respective request signals may also be changed depending on the types of the signals.

FIG. 5 is a flow chart for the operation conducted by the communication apparatus according to the present exemplary embodiment. The respective steps in the present flow chart are processed while the control unit 102 executes the program stored in the storage unit 103.

When the processing is started in response to the instruction of the user, the communication apparatus determines whether its own apparatus is the service using apparatus or the service providing apparatus as the role in the service processing (S501). In a case where its own apparatus is the service using apparatus, the service search is executed to search for the service providing apparatus (S502). This service search processing uses the Service Discovery processing defined by the Wi-Fi Direct specification. As described in FIG. 4, the Service Discovery processing includes performing the device discovery processing based on the Probe Request signal and issuing the service query towards the communication apparatus detected in the device discovery processing.

In the service search processing, the communication apparatus determines whether or not the service providing apparatus that provides the desired service can be detected (S503).

In the decision processing in S503, in a case where the opposite party apparatus does not exist or a case where the communication apparatus operating as the opposite party apparatus can be detected but the communication apparatus does not provide the desired service, the communication apparatus executes the error processing and aborts the processing (S510).

On the other hand, in step S503, in a case where it is determined that the opposite party apparatus can be detected and the desired service is provided, the communication apparatus starts the preparation processing for the service processing (S504). In the present step, the communication apparatus stores the MAC address of the opposite party apparatus corresponding to the communication opposite party in the storage unit 103 as the identification information.

Subsequently, to execute the service processing on the application layer, the connection processing on the wireless LAN layer is first executed. Specifically, since this processing is the connection processing based on the Wi-Fi Direct specification, the communication apparatus executes the role decision processing called Group Formation (S505). The role decided upon herein is the role of the GO or the CL described above.

After the role is decided upon, the communication apparatus executes the parameter setting processing for setting the wireless LAN parameter and the IP address (S506). Although S506 is described as a single step in the present flow chart, specifically, as described in the explanation in FIG. 2, the wireless parameter setting processing based on the WPS protocol and the IP address allocation processing based on the DHCP protocol are conducted. That is, while the apparatus operating as the GO is the WPS Registrar and the apparatus operating as the CL is the WPS Enrollee, the parameter used for the wireless LAN connection which is held by the GO is transferred. Subsequently, while the GO is the DHCP server and the CL is the DHCP client, the allocation processing of the IP address is executed.

Herein, since the IP addresses are allocated to its own apparatus and the opposite party apparatus, the MAC address obtained in the service search processing is to be associated with the IP address. This is because since the protocol of the application layer such as DLNA, Bonjour, or IPP is operated on TCP/IP, the IP address is used to execute the service on the application layer.

In view of the above, the communication apparatus executes the IP address obtaining processing from the MAC address based on the RARP protocol defined by the RFC 903 (S507). After the completion of the obtaining processing in S507, the communication apparatus executes the replacement processing for changing the identification information stored in step S504 from the MAC address to the IP address (S508). Since the information used for the service execution is confirmed through this replacement processing, the communication apparatus can perform the service processing (S509).

On the other hand, in S501, in a case where it is determined that its own apparatus is the service providing apparatus, the communication apparatus promptly starts the service (S511). Specifically, the service information on the application layer which is provided or is expected to be provided by its own apparatus is announced by UPnP, Bonjour, or the like. In addition, the information setting is carried out for the response in a case where the search is conducted through the Service Discovery processing defined by the Wi-Fi Direct specification.

After the service is started, the communication apparatus stands by to be detected by the service using apparatus (S512). In a case where the communication apparatus is detected from the opposite party apparatus operating as the service using apparatus, the processing from step S505 to step S509 is executed similarly as in the service using apparatus described above.

In a case where the communication apparatus is not detected from the service using apparatus, the communication apparatus stands by until being detected. Herein, when a predetermined time elapses and times out, the processing may be aborted as error end.

In the present flow chart, the example has been described in which the service using apparatus receives the request signal in the various signals and receives the response from the service providing apparatus. However, the request signal may be transmitted from the service providing apparatus, and the response may be received from the service using apparatus. The transmission apparatus for the respective request signals may also be changed depending on the types of the signals.

As described above, according to the present exemplary embodiment, the search by the protocol such as UPnP, Bonjour, or the like is not conducted again after the completion of the wireless LAN connection, and the load on the processing is reduced. It is then possible to decide upon the communication opposite party through the service search processing executed before the wireless LAN connection, and it is possible to shorten the time until the service is executed, so that the service can more efficiently be used.

Second Exemplary Embodiment

According to the first exemplary embodiment, the method has been described with which the MAC address obtained in the discovery processing on the wireless LAN layer is stored, and the corresponding IP address is obtained from the MAC address by using RARP. According to the present exemplary embodiment, a case will be described in which the notification by way of the communication packet is executed when the IP address is confirmed without using the RARP protocol. The configurations of the respective apparatuses are the same as those illustrated in FIG. 1 and FIG. 2 as in the first exemplary embodiment, and the system configuration is the same as that illustrated in FIG. 3, so that the description of these will be omitted.

FIG. 6 is a sequence diagram illustrating a communication between the STA-A and the STA-B according to the second exemplary embodiment. The present sequence is partly different from the sequence processing illustrated in FIG. 4 according to the first exemplary embodiment. The same processing as that in FIG. 4 is assigned with the same numeral.

The STA-A operating as the service providing apparatus starts the provision of the service in response to the instruction from the user (F401). On the other hand, the STA-B operating as the service using apparatus starts the service search processing for searching for the service providing apparatus in response to the instruction from the user (F402).

Prior to the service search, the STA-B that has received the instruction of the service search processing from the user in F402 performs the broadcast transmission of the Probe Request signal to search for the opposite party apparatus corresponding to the communication opposite party (F403).

When the Probe Request signal is received, the STA-A replies the Probe Response signal to the STA-B (F404). Since the STA-B receives the Probe Response signal, it is possible to recognize that the STA-A exists as the candidate apparatus corresponding to the communication opposite party. Therefore, the STA-B transmits the SD Query signal to investigate whether or not the STA-A can provide the service desired by the user (F405). The SD Query signal is a query signal for investigating whether or not the communication apparatus at the transmission destination provides the desired service as described above. The SD Query signal may specify a wild card for searching for all the services or may also specify a particular service. The query based on the present SD Query signal can be executed before the communication apparatuses establish a wireless LAN connection (in a pre-association state).

The STA-A that has received the SD Query signal transmits the SD Response signal as a response (F406). In a case where the SD Query signal specifies the wild card, the SD Response signal includes the information indicating the service provided by the STA-A. On the other hand, the SD Query signal specifies the particular service, the SD Response signal includes the information as to whether or not the STA-A can provide this particular service. When the SD Response signal is transmitted, the STA-A holds the identification information such as the MAC address of the STA-B that has transmitted the SD Query in its own storage unit.

In a case where the STA-B refers to the content of the SD Response signal and confirms that the STA-A can provide the desired service on the basis of the decision by the user or the self-governing decision by the communication apparatus, the STA-B holds the identification information such as the MAC address of the STA-A in the storage unit. The STA-B then performs the service start instruction of the desired service in accordance with the instruction of the user (F407).

Herein, the example has been described in which the query on the providing service is conducted by the SD Query signal after the search for the communication apparatus by the Probe Request signal is conducted. However, the additional information element related to the service on the application layer may be added to the Probe Request signal, and the search including the service of the opposite party apparatus may be conducted only by the Probe Request signal. In this case, the exchange of the SD Query signal and the SD Response signal may or may not be conducted. It is however noted that the holding of the identification information such as the mutual MAC address is similarly executed.

The STA-B executes the connection processing for the wireless LAN in accordance with the service start instruction F407. According to the present exemplary embodiment, the Group Formation processing is executed to carry out the connection processing for the wireless LAN based on the Wi-Fi Direct specification (F408). The present processing is controlled by the above-described Go Negotiation control unit 203. The Group Formation processing is role decision processing for deciding upon which one of the two communication apparatuses operates as the GO and the other of which operates as the CL. As a result of this role decision processing, it is set that the STA-A starts the operation as the GO (F409), and the STA-B starts the operation as the CL (F410).

Therefore, the WPS parameter exchange processing is executed while the STA-A is set as the WPS Registrar and the STA-B is set as the WPS Enrollee (F411).

Subsequently, the IP address setting processing is executed while the STA-A is set as the DHCP server and the STA-B is set as the DHCP client (F412).

The STA-B is notified of the service information of the STA-A by the Service Discovery processing in F405 and F406. In view of the above, the STA-A notifies the STA-B of the IP address of the STA-A used for executing the service processing on the application layer. Herein, through the exchange of the SD Query signal and the SD Response signal, the STA-A notifies the STA-B of the IP address.

That is, the STA-B transmits the SD Query signal to the STA-A (F601). In response to the signal, the STA-A transmits the SD Response signal to the STA-B (F602). The SD Query signal transmitted in F601 has a different content from the SD Query signal transmitted in F405. The SD Query signal transmitted in F405 is used for the query on the service provided by the STA-A, but the SD Query signal in F601 is used for the query on the IP address of the STA-A. That is, the SD Query signal transmitted in F601 and the SD Query signal transmitted in F405 have different contents of the query information.

A reason why the notification processing for the IP address is conducted here is that the protocol on the application layer such as DLNA or Bonjour is operated on TCP/IP, and the IP address is to be used to execute the service on the application layer.

Through the IP address notification processing in F601 and F602, the STA-B can confirm the IP address of the STA-A which is used for the service processing. For that reason, without executing the device search function on TCP/IP (for example, UPnP, Bonjour, or the like) again, it is possible to execute the service on the application layer (F415).

According to the present second exemplary embodiment, the SD Query signal and the SD Response signal are used for the notification of the IP address, but the other signal (such as an action frame defined by the IEEE802.11 specification) may be used so long as the STA-A can notify the STA-B of the IP address. The sequence diagram of FIG. 6 is not intended to limit the signal type.

In the present sequence diagram, the example has been described in which the service using apparatus receives the request signal in the various signals and receives the response from the service providing apparatus. However, the request signal may be transmitted from the service providing apparatus, and the response may be received from the service using apparatus. The transmission apparatus for the respective request signals may also be changed depending on the types of the signals.

FIG. 7 is a flow chart for the operation conducted by the communication apparatus according to the present exemplary embodiment. The respective steps in the present flow chart are processed while the control unit 102 executes the program stored in the storage unit 103. In the flow chart of FIG. 7, the same processing as the flow chart described in FIG. 5 according to the first exemplary embodiment is assigned with the same numeral.

When the processing is started in response to the instruction of the user, the communication apparatus determines whether its own apparatus is the service using apparatus or the service providing apparatus as the role in the service processing (S501). In a case where its own apparatus is the service using apparatus, the service search is executed to search for the service providing apparatus (S502). This service search processing uses the Service Discovery processing defined by the Wi-Fi Direct specification. As described in FIG. 4, the Service Discovery processing includes performing the device discovery processing based on the Probe Request signal and issuing the service query towards the communication apparatus detected in the device discovery processing.

In the service search processing, the communication apparatus determines whether or not the service providing apparatus that provides the desired service can be detected (S503).

In the decision processing in S503, in a case where the opposite party apparatus does not exist or a case where the communication apparatus operating as the opposite party apparatus can be detected but the communication apparatus does not provide the desired service, the communication apparatus executes the error processing and aborts the processing (S510).

On the other hand, in step S503, in a case where it is determined that the opposite party apparatus can be detected and the desired service is provided, the communication apparatus starts the preparation processing for the service processing (S504). In the present step, the communication apparatus stores the MAC address of the opposite party apparatus corresponding to the communication opposite party in the storage unit 103 as the identification information.

Subsequently, to execute the service processing on the application layer, the connection processing on the wireless LAN layer is first executed. Specifically, since this processing is the connection processing based on the Wi-Fi Direct specification, the communication apparatus executes the role decision processing called Group Formation (S505). The role decided upon herein is the role of the GO or the CL described above.

After the role is decided upon, the communication apparatus executes the parameter setting processing for setting the wireless LAN parameter and the IP address (S506). Although S506 is described as a single step in the present flow chart, specifically, as described in the explanation in FIG. 2, the wireless parameter setting processing based on the WPS protocol and the IP address allocation processing based on the DHCP protocol are conducted. That is, while the apparatus operating as the GO is the WPS Registrar and the apparatus operating as the CL is the WPS Enrollee, the parameter used for the wireless LAN connection which is held by the GO is transferred. Subsequently, while the GO is the DHCP server and the CL is the DHCP client, the allocation processing of the IP address is executed.

Herein, since the IP addresses are allocated to its own apparatus and the opposite party apparatus, the MAC address obtained in the service search processing is to be associated with the IP address. This is because since the protocol of the application layer such as DLNA, Bonjour, or IPP is operated on TCP/IP, the IP address is used to execute the service on the application layer.

Therefore, the action frame defined by the IEEE802.11 or the like is used to execute the notification processing for the IP addresses of the mutual apparatuses between the service providing apparatus and the service using apparatus (S701). Specifically, the apparatuses are mutually notified of the IP addresses through the exchange of the SD Query signal and the SD Response signal similar to that executed in S502. The action frame is taken as an example in the present description, but another method of using the other packet may also be adopted.

After the completion of the notification processing in S701, the communication apparatus executes the replacement processing for changing the identification information stored in step S504 from the MAC address to the IP address (S508). Since the information used for the service execution is confirmed through this replacement processing, the communication apparatus can perform the service processing (S509).

On the other hand, S501, in a case where it is determined that its own apparatus is the service providing apparatus, the communication apparatus promptly starts the service (S511). Specifically, the service information on the application layer which is provided or is expected to be provided by its own apparatus is announced by UPnP, Bonjour, or the like. In addition, the information setting is carried out for the response in a case where the search is conducted through the Service Discovery processing defined by the Wi-Fi Direct specification.

After the service is started, the communication apparatus stands by to be detected by the service using apparatus (S512). In a case where the communication apparatus is detected from the opposite party apparatus operating as the service using apparatus, the processing from step S505 to step S509 is executed similarly as in the service using apparatus described above.

In a case where the communication apparatus is not detected from the service using apparatus, the communication apparatus stands by until being detected. Herein, when a predetermined time elapses and times out, the processing may be aborted as error end.

In the present flow chart, the example has been described in which the service using apparatus receives the request signal in the various signals and receives the response from the service providing apparatus. However, the request signal may be transmitted from the service providing apparatus, and the response may be received from the service using apparatus. The transmission apparatus for the respective request signals may also be changed depending on the types of the signals.

As described above, according to the present exemplary embodiment, the search by the protocol such as UPnP, Bonjour, or the like is not conducted again after the completion of the wireless LAN connection, and the load on the processing is reduced. It is then possible to decide upon the communication opposite party through the service search processing executed before the wireless LAN connection, and it is possible to shorten the time until the service is executed, so that the service can more efficiently be used. Furthermore, since the notification of the IP address is executed through the exchange of the general SD Query/the SD Response signal or the like, the mounting of a special protocol is not prepared, so that the increase in the processing load on the apparatus is avoided, and it is possible to further more efficiently execute the service.

Third Exemplary Embodiment

According to the first exemplary embodiment and the second exemplary embodiment, the example has been described in which before the connection on the wireless LAN layer is established, the Service Discovery is executed through the processing in F405 and F406. According to the present third exemplary embodiment, a case will be described in which the connection has already been established on the wireless LAN layer. The configurations of the respective apparatuses are the same as those illustrated in FIG. 1 and FIG. 2 as in the first exemplary embodiment, and the system configuration is the same as that illustrated in FIG. 3, so that the description of these will be omitted.

FIG. 8 is a sequence diagram illustrating a communication between the STA-A and the STA-B according to the third exemplary embodiment. FIG. 8 illustrates the processing conducted between the communication apparatuses when the service processing is executed in a case where after the completion of the wireless LAN connection, the service search by the Service Discovery defined by the Wi-Fi Direct specification is executed, and the desired communication apparatus exists.

First, in the STA-A and the STA-B, the wireless LAN connection is started in response to the user instruction (F801, F802).

The STA-B performs the broadcast transmission of the Probe Request signal to search for the device corresponding to the communication opposite party (F803).

When the Probe Request signal is received, the STA-A replies the Probe Response signal to the STA-B (F804). Since the STA-B receives the Probe Response signal, it is possible to recognize that the STA-A exists as the candidate apparatus corresponding to the communication opposite party.

Therefore, the connection processing for the wireless LAN is executed between the STA-A and the STA-B. According to the present exemplary embodiment, the STA-A and the STA-B execute the Group Formation processing to carry out the connection processing for the wireless LAN based on the Wi-Fi Direct specification (F805). The present processing is controlled by the above-described Go Negotiation control unit 203. The Group Formation processing is role decision processing for deciding upon which one of the two communication apparatuses operates as the GO and the other of which operates as the CL.

As a result of the role decision processing, the STA-A starts the operation as the GO (F806), and the STA-B starts the operation as the CL (F807).

Therefore, the WPS parameter exchange processing is executed while the STA-A is set as the WPS Registrar and the STA-B is set as the WPS Enrollee (F808).

Subsequently, while the STA-A is set as the DHCP server and the STA-B is set as the DHCP client, the address setting processing is executed (F809).

After the completion of the wireless LAN connection, the STA-A operating as the service providing apparatus starts the service provision in response to the user instruction (F810). On the other hand, the STA-B operating as the service using apparatus starts the service search processing for searching for the service providing apparatus in response to the instruction from the user (F811).

The STA-B that has received the instruction of the above-described service search processing transmits the SD Query signal to investigate whether or not the STA-A can provide the service desired by the user (F812). The SD Query signal is a query signal for investigating whether or not the communication apparatus at the transmission destination provides the desired service as described above. The SD Query signal may specify a wild card for searching for all the services or may also specify a particular service.

The STA-A that has received the SD Query signal transmits the SD Response signal as a response (F813). In a case where the SD Query signal specifies the wild card, the SD Response signal includes the information indicating the service provided by the STA-A. On the other hand, the SD Query signal specifies the particular service, the SD Response signal includes the information as to whether or not the STA-A can provide this particular service. In a case where the STA-B refers to the content of the SD Response signal and confirms that the STA-A can provide the desired service on the basis of the decision by the user or the self-governing decision by the communication apparatus, the service start instruction is executed in accordance with the instruction of the user (F814).

Since the service information of the mutual devices is exchanged through the Service Discovery processing in F812 and F813, it is possible to execute the service processing on the actual application layer (F815). In the present sequence diagram, the example has been described in which the service using apparatus receives the request signal in the various signals and receives the response from the service providing apparatus. However, the request signal may be transmitted from the service providing apparatus, and the response may be received from the service using apparatus. The transmission apparatus for the respective request signals may also be changed depending on the types of the signals.

Since the connection processing by the wireless LAN has also already been completed at the time of the Service Discovery processing according to the present third exemplary embodiment and the IP address is found out, the processing according to the first exemplary embodiment is different from the processing according to the second exemplary embodiment.

In the explanation of the present third exemplary embodiment, the example has been described in which after only the wireless LAN connection is executed alone, the service search on the application layer and the processing execution are conducted. However, the embodiment can also be applied to a case in which after the service execution on the application layer illustrated according to the first exemplary embodiment or the second exemplary embodiment is previously executed, another service search and execution are conducted while the wireless LAN connection is maintained. For example, a case in which after a metadata file is transmitted from the STA-B to the STA-A, the moving image streaming processing is subsequently conducted or the like is taken as an example.

FIG. 9 is a flow chart for the operation conducted by the communication apparatus according to the present exemplary embodiment. The respective steps in the present flow chart are processed while the control unit 102 executes the program stored in the storage unit 103.

First, to start the wireless LAN connection, the communication apparatus determines whether or not the opposite party apparatus is detected (S901). In a case where the opposite party apparatus is not detected in a certain predetermined time, the processing is aborted as error end (S911).

In step S901, in a case where the opposite party apparatus is detected, the wireless LAN connection is executed first. Herein, the role decision processing called Group Formation based on the Wi-Fi Direct specification is executed (S902).

After the role of the communication apparatus is decided upon in step S902, the parameter setting processing for setting the wireless LAN parameter and the IP address is conducted (S903). Although S902 is described as a single step in the present flow chart, specifically, as described in the explanation in FIG. 2, the wireless parameter setting processing based on the WPS protocol and the IP address allocation processing based on the DHCP protocol are executed. Specifically, while the apparatus operating as the GO is the WPS Registrar and the apparatus operating as the CL is the WPS Enrollee, the parameter used for the wireless LAN connection which is held by the GO is transferred. Subsequently, while the GO is set as the DHCP server and the CL is set as the DHCP client, the IP address allocation processing is executed. Thus, the connection processing on the wireless LAN layer is completed.

Subsequently, the service processing is conducted. First, it is determined whether or not the service start request is issued by the instruction from the user (S904). In a case where the service start request does not exist, the apparatus stands by until the request is issued. Alternatively, in a case where the request is not issued after the apparatus stands by for a predetermined time, the processing may be aborted as time-out error.

Incidentally, in step S904, in a case where the service start request is issued, the service role of its own apparatus is decided upon (S905). The service role herein is a role to be either the providing apparatus or the using apparatus for the various services on the application layer.

A case will be described in which the role of its own apparatus is decided upon as the service providing apparatus in the service role decision in step S905. In a case where its own apparatus is the service providing apparatus, the service providing apparatus stands by to receive the SD Query signal from the opposite party apparatus operating as the service using apparatus (S906). In a case where the SD Query from the opposite party apparatus does not arrive within a predetermined time, the processing is aborted as error end. The apparatus may also stands by unless an explicit cancellation is issued by way of the user instruction without the provision of a time limit.

In a case where the SD Query is received in S906, the corresponding SD Response signal is transmitted (S907).

After the SD Response signal is transmitted as a response to the Service Discovery processing in S907, the IP address of the opposite party apparatus is decided upon (S908). The decision processing for the IP address herein includes storing the IP address of its own apparatus decided upon by itself and the IP address of the opposite party apparatus allocated by its own apparatus as the DHCP server in a case where its own apparatus is the GO. On the other hand, the IP address of its own apparatus received from the opposite party apparatus and the IP address of the opposite party apparatus are stored in a case where its own apparatus is the CL.

A case will be described in which its own apparatus is the service using apparatus in S905. To search for the opposite party apparatus at the service providing source, its own apparatus operating as the service using apparatus transmits the SD Query signal (S912). After the SD Query signal is transmitted, the SD Response is received from the opposite party apparatus (S913). In S913, in a case where the SD Response is not received, the processing starts again from the transmission of the SD Query. In a case where a response is not received after an elapse of a predetermined time or the corresponding service is not offered, the processing may be aborted as error end.

In the explanation of the present third exemplary embodiment, the example has been described in which after only the wireless LAN connection is established alone, the service search on the application layer and the process execution are conducted. However, the embodiment can also be applied to a case in which after the service execution on the application layer according to the first exemplary embodiment or the second exemplary embodiment is previously conducted, another service search and execution are conducted while the wireless LAN connection is maintained. For example, a case in which after a metadata file is transmitted from the STA-B to the STA-A, the moving image streaming processing is subsequently conducted or the like is taken as an example.

As described above, according to the present third exemplary embodiment, in a case where the wireless LAN layer has already been connected, the Service Discovery processing of the Wi-Fi Direct specification is executed, so that the service on the application layer can be used. To elaborate, it is possible to use the service on the application layer without using a complex and unique protocol, so that the service can still more efficiently used.

Other Embodiments

The above-described respective exemplary embodiments are examples for carrying out the present invention and can be modified within a range without departing from the gist of the present invention. The above-described first to third exemplary embodiments can also be combined with each other. In addition, the user may arbitrarily select which one of the first to third exemplary embodiments the respective communication apparatuses follow for the operation.

According to the exemplary embodiments, the configuration has been described in which after the IP address is allocated by DHCP, the query or notification of the IP address is conducted as the information for using the service on the application layer. However, information for using the service on the application layer is not limited to the IP address, and other information may also be employed. For example, information such as a URL corresponding to an address for accessing the service or a port number of TCP/IP may be used.

The communication apparatus according to the above-described exemplary embodiments is not limited to the digital camera, the printer, or the like. A PC or a tablet terminal may be used, and also a mobile terminal such as a mobile phone or a smart phone may be employed. In addition, an image processing apparatus such as a copier, a scanner, a facsimile, or a multi-function device or a digital household electrical appliance such as a television set or a recorder may also be used.

The exemplary embodiments have been described while taking the IEEE802.11 compliant wireless LAN as an example. However, the exemplary embodiments of the present invention may be carried out in the other wireless communication such as wireless USB, MBOA, Bluetooth (registered trademark), UWB, or ZigBee (registered trademark). In addition, the exemplary embodiments of the present invention may be carried out in a wired communication medium such as a wired LAN. MBOA herein is an abbreviation of Multi Band OFDM Alliance. UWB includes wireless USB, wireless 1394, WINET, or the like.

Furthermore, the exemplary embodiments of present invention can be realized by executing the following processing. That is, the software (program) for realizing the functions of the above-described exemplary embodiments is supplied to a system or an apparatus via a network or various storage media, a computer (or a CPU, an MPU, or the like of the system or the apparatus reads out the program code and execute the processing. In this case, the program or the storage media storing the program constitute the present invention.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the exemplary embodiments of present invention, the service can still more efficiently used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-029950, filed Feb. 19, 2013, which is hereby incorporated by reference herein in its entirety.

REFERENCE SIGNS LIST

102 Control unit
103 Storage unit
104 Wireless unit
105 Display unit

The invention claimed is:
1. A communication apparatus comprising:
at least one processor; and
at least one memory storing code to be executed by the at least one processor, wherein the at least one processor is configured to execute as:

a search unit configured to search for, by using an action frame defined by IEEE 802.11u, an apparatus that provides a particular service;

a storage unit configured to store a MAC address of another communication apparatus searched for by the search unit;

a connection unit configured to establish a wireless connection to said another communication apparatus by using the MAC address stored by the storage unit; and an obtaining unit configured to obtain, after the connection unit establishes the wireless communication to said another communication apparatus, an IP address of said another communication apparatus by using the MAC address of said another communication apparatus without execution of service search processing on an IP protocol, a deciding unit configured to decide upon a role at a time of a wireless communication with said another communication apparatus searched for by the search unit, an allocation unit configured to allocate an address to said another communication apparatus in a case where the role decided upon by the deciding unit is as an apparatus that constructs the wireless network; and a receiving unit configured to receive an allocation of an address from said another communication apparatus in a case where the role decided upon by the deciding unit is as an apparatus that joins a constructed wireless network, wherein a service provided by said another communication apparatus is used by using the obtained IP address, wherein the at least one processor constructs a wireless network or joins a wireless network while playing the role decided upon by the deciding unit to connect to said another communication apparatus.

2. The communication apparatus according to claim 1, wherein the obtaining unit obtains address of said another communication apparatus by using RARP.

3. The communication apparatus according to claim 1, wherein the particular service includes a printing service, a moving image streaming service, or a file transfer service.

4. The communication apparatus according to claim 1, wherein the communication apparatus communicates with said another communication apparatus by using an IEEE802.11 compliant wireless LAN.

5. The communication apparatus according to claim 1, wherein the search unit searches for an apparatus that provides the particular service, by transmitting an SD Query signal.

6. The communication apparatus according to claim 1, wherein the connection unit executes connection processing based on the Wi-Fi Direct specification.

7. The communication apparatus according to claim 1, wherein the service search processing on the IP protocol is executed by using UPnP or Bonjour.

8. A control method for a communication apparatus, the control method comprising:

searching for an apparatus that provides a particular service by using an action frame defined by IEEE 802.11u;

storing a MAC address of another communication apparatus searched for;

establishing a wireless connection to said another communication apparatus searched for in the searching by using the stored MAC address; and obtaining, after establishing the wireless connection to said another communication apparatus, an IP address of said another communication apparatus by using the MAC address of said another communication apparatus without execution of service search processing on an IP protocol, deciding upon a role at a time of a wireless communication with said another communication apparatus searched for by the searching, allocating an address to said another communication apparatus in a case where the role decided upon is as an apparatus that constructs the wireless network; and receiving an allocation of an address from said another communication apparatus in a case where the role decided upon is as an apparatus that joins a constructed wireless network, wherein a service provided by said another communication apparatus is used by using the obtained IP address, wherein the at least one processor constructs a wireless network or joins a wireless network while playing the role decided upon by the deciding to connect to said another communication apparatus.

9. A non-transitory computer-readable storage medium storing a computer program for causing a computer to execute a control method for a communication apparatus, the method comprising steps of:

searching for an apparatus that provides a particular service by using an action frame defined by IEEE 802.11u;

storing a MAC address of another communication apparatus searched for;

establishing a wireless connection to said another communication apparatus searched for in the searching by using the stored MAC address; and obtaining, after establishing the wireless connection to said another communication apparatus, an IP address of said another communication apparatus by using the MAC address of said another communication apparatus without execution of service search processing on an IP protocol, deciding upon a role at a time of a wireless communication with said another communication apparatus searched for by the searching, allocating an address to said another communication apparatus in a case where the role decided upon is as an apparatus that constructs the wireless network; and receiving an allocation of an address from said another communication apparatus in a case where the role decided upon is as an apparatus that joins a constructed wireless network, wherein the service provided by said another communication apparatus is used by using the obtained IP address, wherein the at least one processor constructs a wireless network or joins a wireless network while playing the role decided upon by the deciding to connect to said another communication apparatus.

* * * * *